July 19, 1932.　　　K. OBERMOSER　　　1,868,245

ELECTRIC MOTOR STARTING CLUTCH

Filed June 17, 1926　　　3 Sheets-Sheet 1

Inventor:-
Karl Obermoser
by his attorney

July 19, 1932.  K. OBERMOSER  1,868,245

ELECTRIC MOTOR STARTING CLUTCH

Filed June 17, 1926  3 Sheets-Sheet 2

Inventor:-
Karl Obermoser
by his attorney

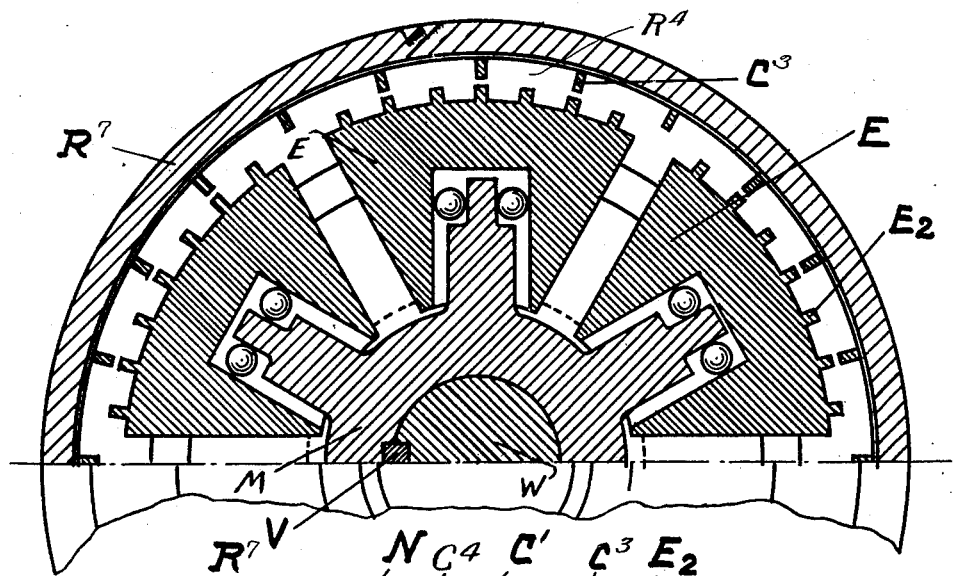
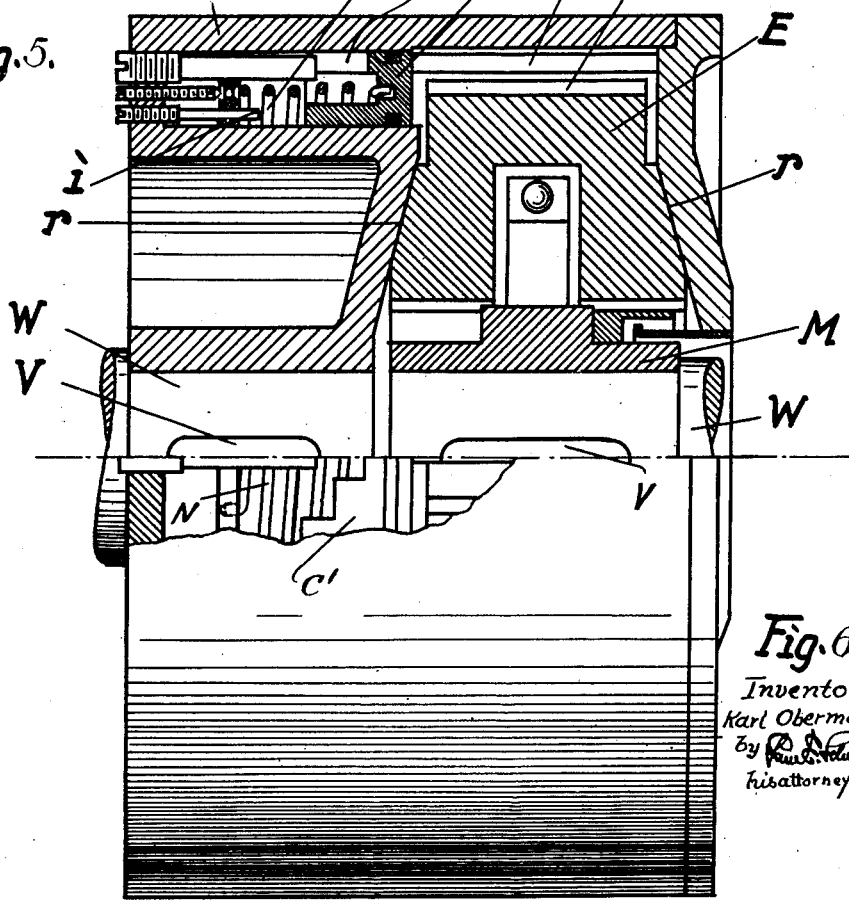

Patented July 19, 1932

1,868,245

UNITED STATES PATENT OFFICE

KARL OBERMOSER, OF BADEN-BADEN, GERMANY

ELECTRIC MOTOR STARTING CLUTCH

Application filed June 17, 1926, Serial No. 116,622, and in Germany June 18, 1925.

This invention relates to an automatic clutch coupling for starting the load of an alternating current electric motor, and has for its object to enable the electric motor to be started light and then connected to its load without causing any undue rush of current such as would affect the net to which the motor is connected.

The invention relates to a well-known type of automatic clutch coupling operated by centrifugal force. In known clutch couplings of this type in which the clutch is operated at a definite predetermined speed, the centrifugal elements have been adapted to act against spring operated toggle mechanism or other means which releases the centrifugal elements at a definite speed, a dash pot or other retarding device being provided in some cases so as to avoid too sudden application of the load. It has also been proposed to provide centrifugal clutch devices in which the centrifugal elements are normally prevented by abutments from moving to the clutching position and can only be freed by sudden acceleration or deceleration of the motor after a predetermined speed has been attained.

According to the present invention a clutch coupling is provided comprising a driving clutch member adapted to be moved into engagement with the driven clutch member of the coupling automatically when the motor has attained its maximum speed, but wherein the clutching action is not initiated until the motor has ceased to accelerate, and wherein a time lag device or means governing the movement of the movable clutch member is provided to allow time for the starting connection in the supply circuit of the motor to be cut out after the motor has reached its maximum speed but before the load is applied.

In a modified form of the invention means for preventing engagement of the clutch member whilst the motor is accelerating is provided comprising a body of fluid, preferably oil or other liquid, which rotates with the clutch member and produces a pressure due to centrifugal force upon a piston or like displaceable member which is adapted to be moved against the action of a spring when the speed of rotation reaches a predetermined limit so as to release the liquid and allow the movable clutch member to move into driving engagement with the driven member, the movement of the piston or like member being retarded by friction means so as to delay the engagement of the clutch member.

Three forms of construction according to the invention are illustrated in the accompanying drawings, in which:—

Fig. 5 is a cross-section showing still another form of the invention.

Fig. 6 is a side elevation thereof, partly in longitudinal section.

Figure 2:
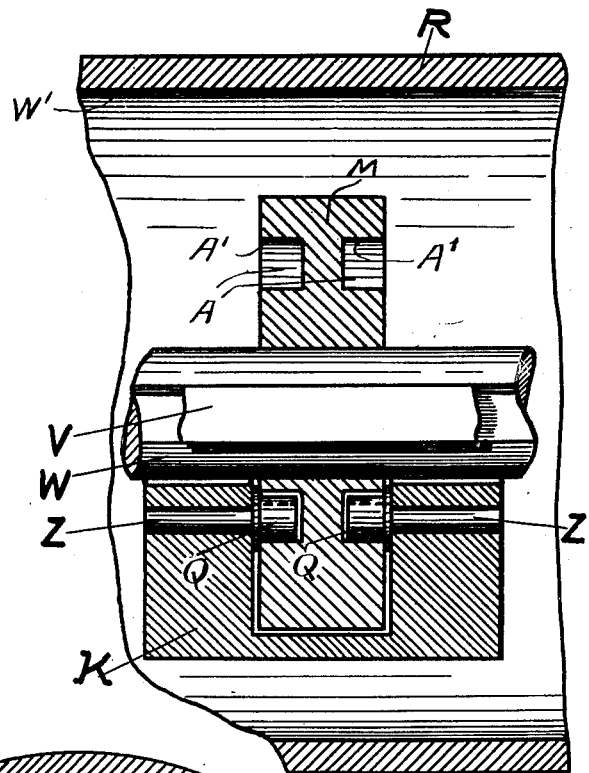
Fig. 2 is a longitudinal section of the same taken along the axis of rotation of the coupling.
Figure 1:
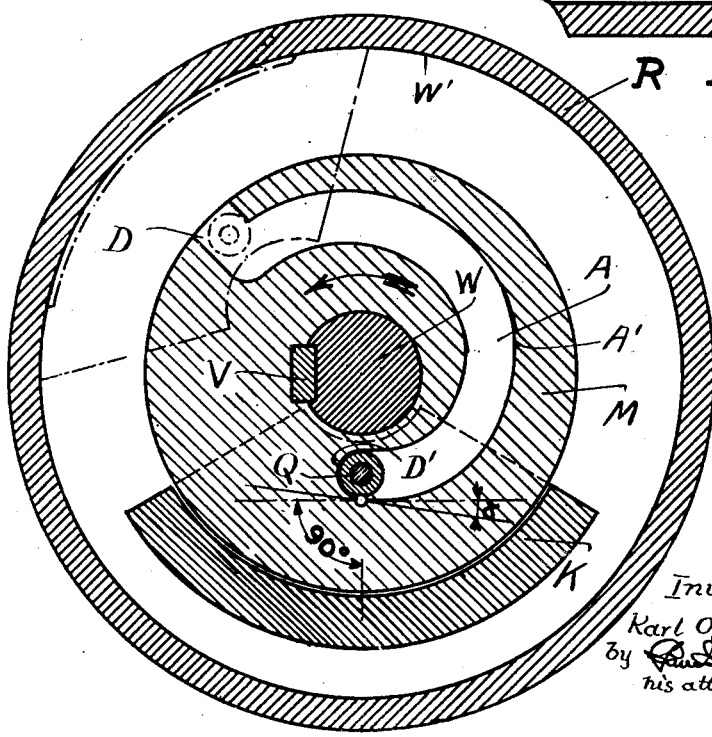
Fig. 1 is a cross-section of a clutch coupling according to one form of construction.

Referring now more particularly to Figs. 1 and 2 of the drawings, R is a driven clutch member in the form of a hollow pulley loosely mounted on the driving motor shaft W, which pulley is provided with an internal friction surface W' and in practice transmits its driving power to the load in any suitable manner. Rigid with the shaft W, as by means of a key V, is a body or sleeve M in the form of a flat-sided cylinder, the sides of which are provided with grooves A receiving rollers Q mounted on studs Z carried by a segment-shaped driving clutch device or member K which is bifurcated to partially embrace the sleeve M so as to permit it to swing and to travel partially around the circumference of said sleeve through pivotal motion on the rollers and studs and travel of the latter in the grooves A. The grooves A are cam-shaped and have the particular form of a logarithmic spiral, each groove being closed at one end D' and open at its opposite end D, the closed end D' being positioned close to the axial center of the sleeve M and the groove thence extending in a spiral path progressively toward the periphery of the sleeve and intersecting the latter at the open end D.

When the clutch is in normal position or at rest the clutch member K occupies the retracted position shown in full lines at the lower portion of Fig. 1, in which the rollers Q abut against the inner end walls D' of the grooves A so that the outer curved friction surface of the clutch member K is disposed at its maximum distance from the friction surface W' of the clutch member R. The clutch member K is adapted to be thrown outward automatically by centrifugal force, when the shaft W is driven at a predetermined speed, to the dotted line position shown in Fig. 1, in which its curved face frictionally engages the friction surface W' of the clutch member R, in which operation the member K swings from retracted to active position about the circumference of sleeve M and the rollers Q travel from the closed ends D' to the open ends D of the grooves A, thus coupling the two members of the clutch together to transmit driving motion to the member R.

The weight or mass and inertia of the clutch member K are such that its motion for a clutch action will begin only under a predetermined centrifugal force on a predetermined speed of rotation of shaft W, and the outward movement of said clutch member K is also resisted by the frictional engagement of rollers Q with the outer walls A' of the grooves A, which rollers and wall serve as a time lag or retarding device so governing the outward travel of member K as to prevent its engagement with member R during the accelerating period of the motor in the starting action and permitting such engagement of the clutch members only after the accelerating period of the motor has ceased, i. e., after the motor has reached its full speed and the starting switch is cut out and the motor is supplied with current from the line. When the starting switch is thrown into action and supplies current to the motor and the latter reaches a certain speed, the clutch member K begins its outward movement, which is retarded by frictional impingement of rollers Q against walls A', so that a definite time period is required for the member K to engage member R, during which period the starting switch is cut out and the motor cut into the circuit of the main line, so that the load will be applied only after the motor has reached its maximum speed and the starting switch has been cut out. It will be understood, of course, that the cam shape or degree of spirality of the grooves A and the frictional resistance of the walls of the grooves to the movement of the member K will be so chosen with respect to the centrifugal force acting on the member K that upon cessation of the acceleration of the masses, that is, when the motor has attained its highest speed, the member K will begin its outward movement in the direction of the arrow in Fig. 1 along grooves A under centrifugal force governed by a determined frictional resistance of the walls A', due to the fact that the surface A' is not tangential or perpendicular to the radially directed centrifugal action but is at all times inclined thereto at the angle $\alpha$. By this means the engagement of the clutch is made dependent upon the lapse of a certain interval of time from the cessation of acceleration of of the masses. When the current is cut off and the motor speed drops to a certain degree below the maximum the clutch member K returns by gravity to its retracted position.

The movement of element K is retarded by the frictional resistance of the medium by a solid, liquid or gaseous medium being employed and being in frictional contact with element K. The medium is frictionally moved by the element K and the movement is gradually accelerated and finally speeded up to the speed or almost the speed of element K. Then, owing to this speeding up, the frictional resistance between the medium and element K becomes smaller and smaller, with the result that the distance from Q to D can be travelled through and engagement take place. Coupling element K, guided in spiral shaped grooves A1 and A2, retards the throwing of the load onto shaft W not only to the moment when the accelerating pressure from the motor shaft ceases, that is, until synchronism has been reached, but even for such additional length of time as the medium needs to come up to the number of revolutions. There is, consequently, after synchonism has been reached, still sufficient time left to carry out the coupling movement before the load is thrown onto the motor shaft.

Figure 3:
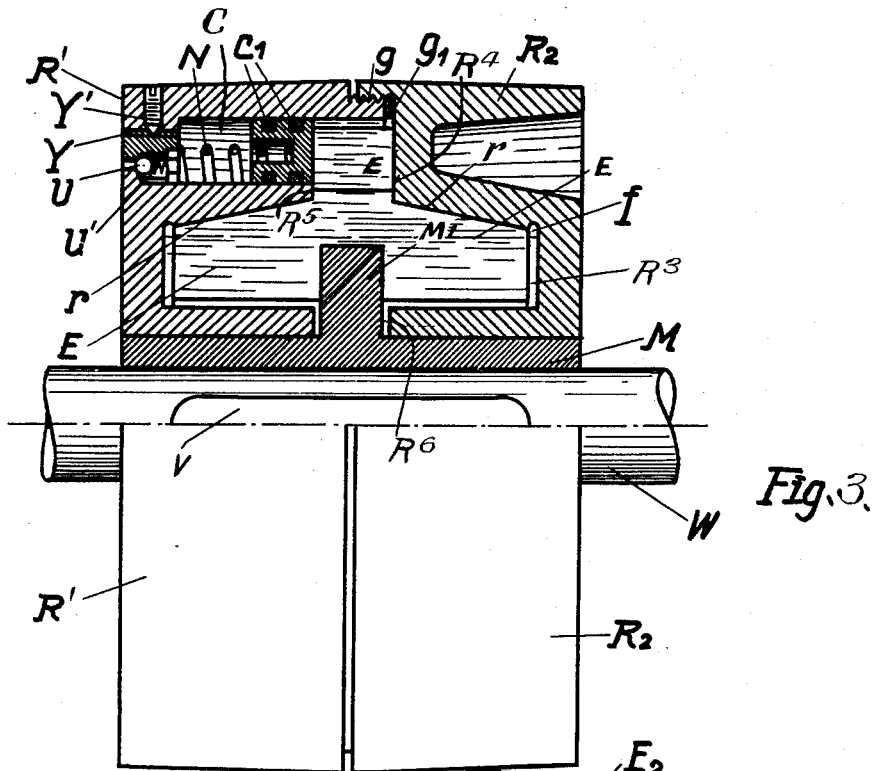
Fig. 3 is an elevation, partly in section of another form of construction.
Figure 4:
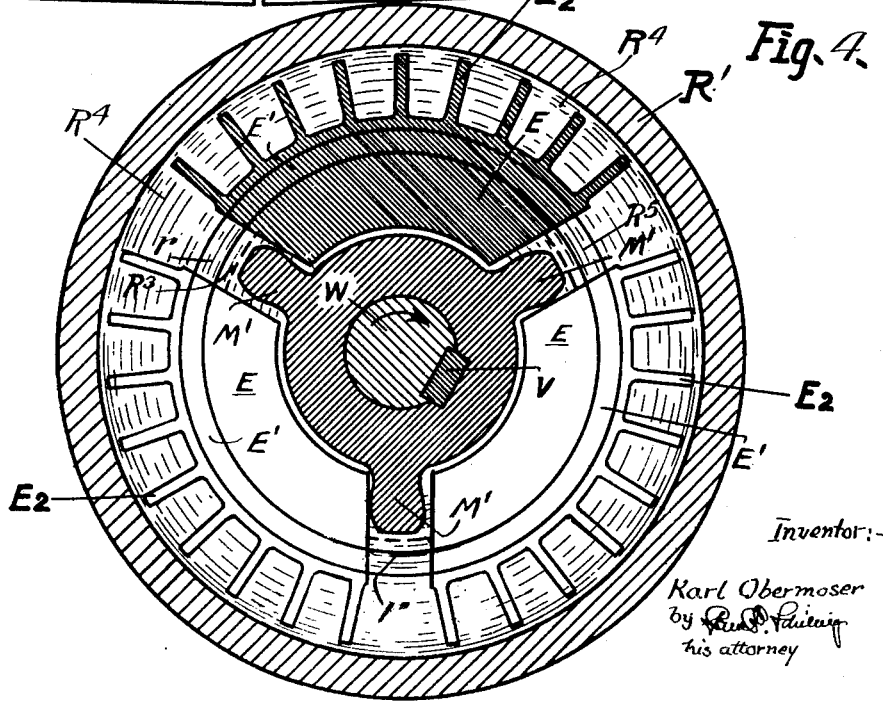
Fig. 4 is a part cross-sectional view of the same.

Figs. 3 and 4 show a coupling in which the engagement of the coupling members by centrifugal force is resisted up to a certain degree by fluid pressure and is permitted by the reduction of the fluid pressure resistance upon an increase in the centrifugal force. In this construction the driven coupling member is formed of two transversely divided sections R', R² united by a threaded connection $g$, the joint being sealed by a packing $g'$ to prevent the escape of contained fluid. These sections are formed to provide an annular chamber R³ and a channel R⁴ connected by an intervening slot R⁵, said chamber and channel being designed to contain oil, compressed air or other fluid. The body or sleeve M here is fixed to the shaft W and enclosed in the hub of the driven clutch member and is provided with a series of three equidistantly arranged radial teeth or abutments M' which project into the chamber R³ through an annular slot R⁶ formed in the driven clutch member. In this construction the driving clutch device comprises three equidistantly arranged segments E disposed at their inner portions about the sleeve M and in the spaces between the teeth thereof and coupled by said teeth to the sleeve to rotate therewith and with the shaft W. The segments E have their body portions disposed in the chamber R³ and are provided with inclined friction clutch faces E' to engage correspondingly inclined friction faces r on the member R', R², and said segments are also provided with blades or vanes E² projecting through the slot R⁵ into the channel R⁴. In practice the pressure of the fluid medium in the chamber R³ and channel R⁴ is such that it, in connection with a retarding means, hereinafter described, establishes a resistance to the outward movement of the clutch sections E under centrifugal force to prevent coupling engagement of the surfaces E' and r until the motor has accelerated to maximum speed and the centrifugal force is sufficient to displace a portion of the fluid together with a member of the retarding means, permitting of such displacement, whereby a timed movement of the surfaces E' into engagement with the surfaces r is effected. The retarding device comprises a chamber C whose inner end intersects the channel and is normally closed against communication with the channel by a packed piston or displaceable member C' held in its normal position, until a predetermined pressure of the fluid is exceeded, by a spring N. At the outer end of the chamber C is a vent opening Y governed by a screw plug valve Y' whereby the escape of air or other fluid behind the piston may be regulated to establish, with the spring N, any determined resistance to the outward movement of the piston, by which means a timed period of movement of the piston to a degree to permit displacement of a sufficient amount of fluid from the chamber R³ and channel R⁴ into the chamber C for a sufficient reduction of pressure to allow the clutch segments E to engage the clutch member R is effected. Also at the outer end of chamber C is an air inlet U controlled by an inwardly opening ball check valve U' for admission of air behind the piston in a clutch releasing action and on the return of the piston, after displacement, to its normal position. The vanes E² in their travel in the channel R⁴ act in connection with the segments E to apply pressure to the fluid for the fluid displacement action.

In the embodiment of the invention shown in Figs. 5 and 6 the general construction and operation is the same as in Figs. 3 and 4 except that the piston C' and its chamber extend about the sleeve M at one side of the transverse center of the clutch, while the clutch elements are arranged at the opposite side of the transverse center of the clutch and the driven clutch member R⁷ is changed in its internal form accordingly. Also in this construction the piston C' is provided with blades or vanes C³ having a splined relation to the piston and extending into channel R⁴, while the piston spring N is a spiral spring which extends around the piston channel and is terminally fixed to the piston and to the member R⁷. One of these blades C³ is extended to form a key C⁴ rotatable with but slidably engaged by the annular piston. When the driving clutch device is started into motion and upon the motor reaching a predetermined speed, the blades E² of said clutch device act on the fluid in the channel to cause the fluid to exert pressure on the blades, whereby the clutch member R⁷ is turned at slow speed. The piston C' will now be subjected to two forces, i. e., the force of the fluid pressure causing it to move outwardly in its chamber against the collapsing resistance of spring N and the turning force on it through the pressure of the fluid on blades C³ and C⁴ against the resistance of spring N, which is thereby wound up or tensioned. This turning movement of the piston continues until the clutching action is completed and the piston rotates with the clutch members in its displaced position. When the clutch is released the spring returns the parts to normal position. It will thus be seen that this construction effects a starting of the driven clutch member into motion before a clutch engagement is effected and at the same time provides for a retarding resistance in the fluid displacement motion of the piston as well as a retarding resistance due to the rotary motion of the piston, which may be found to be desirable under some conditions.

What I claim is:

1. In a coupling device for coupling a motor to its load, an outer rotatable coupling member having friction surfaces and a fluid containing channel provided with an outlet, an inner coupling member rotatable within the outer coupling member, devices carried by and rotatable with the inner coupling member and movable in the channel of the outer coupling member for compressing the fluid therein, said devices being movable radially outward and having friction surfaces operative under centrifugal force for a progressive frictional binding action on the friction surfaces of the outer coupling member to progressively transmit motion thereto from the inner coupling member.

2. In a coupling device for coupling a motor to its load, an outer rotatable coupling member having friction surfaces, a fluid containing channel provided with an outlet, an inner rotatable coupling member movable within the outer coupling member, and devices rotatable with the inner coupling member and movable in the channel of the outer coupling member for compressing the fluid therein, said devices being radially movable under centrifugal force and having friction surfaces engageable with the friction surfaces of the outer coupling member progressively in the rotation of said coupling members for gradually transmitting motion from the inner coupling member to the outer coupling member, and means controlling the discharge of the fluid through said outlet to cause said fluid to oppose a yielding resistance to the movement of the devices.

3. In a coupling device for coupling a motor to its load, an outer rotatable coupling member provided with friction surfaces, and a fluid containing channel provided with a discharge outlet, a valve governed by fluid pressure and controlling the discharge of fluid through said outlet, an inner rotary coupling member movable within the outer coupling member, radial projections on said inner coupling member, and devices between the coupling members guided between said radial projections for radial movement and rotatable thereby with the inner coupling member in the channel of the outer coupling member for compressing the fluid therein, said devices being movable radially outward under centrifugal force and having friction surfaces engageable with the friction surfaces of the outer coupling member under centrifugal force and governed by the pressure of the fluid for gradually transmitting motion from the inner coupling member to the outer coupling member.

4. An automatic clutch coupling for starting the load of an alternating current motor comprising a driven member for transmitting motion to the load, a driving member automatically movable by centrifugal force for coupling engagement with the driven member and operative to start its motion in coupling direction when the motor reaches its maximum speed, primary means for retarding such movement of the driving member and delaying the coupling action for a time period to allow cutting out of the starting current connections, and further means for retarding the coupling engagement of the driving member with the driven member during connection of the motor with the line supply and before the load is coupled thereto.

5. An automatic clutch coupling for starting the load of an alternating current motor comprising a driven member for transmitting motion to the load, a driving member automatically movable by centrifugal force for coupling engagement with the driven member when the motor reaches its maximum speed, a time lag device for retarding the movement of the driving member and delaying the coupling action for a time period to allow cutting out of the starting current connections and connection of the motor with the line supply after the motor has reached its maximum speed and before the load is coupled thereto, and further means auxiliary to said time lag device for yielding retarding the movement of the driving member.

6. An automatic clutch coupling for starting the load of an alternating current motor comprising a driven member for transmitting motion to the load, said driven member containing a body of fluid, a driving member automatically movable by centrifugal force for coupling engagement with the driven member when the motor reaches its maximum speed, said driving member being operative in action for compressing said fluid, and a time lag device coacting with the fluid to oppose a resistance to the movement of the driving clutch member into coupling engagement with the driven clutch member and adapted to permit displacement of the fluid for gradual movement of the driving clutch member into engagement with the driven clutch member.

7. An automatic clutch coupling for starting the load of an alternating current motor with short circuit motor winding comprising a driven clutch member and a driving clutch member, said driving clutch member having a course of travel under centrifugal force for bringing it into engagement with the driven clutch member and said driving clutch member also having a normal resistance to starting its travel sufficient to prevent initiation of its travel during the time period of acceleration of the motor and until the motor has attained its maximum speed, and retarding means acting to initiate a primary resistance to travel of the primary clutch element in its course to delay such travel for a time period to allow starting of the motor and its acceleration to maximum speed under starting voltages and for then further instituting a yielding resistance to a clutching engagement between the clutch members to allow time for the starting connection of the supply circuit of the motor to be cut out and line current to be cut in after the motor has attained its maximum speed but before the load is applied.

8. A starting clutch for an alternating current induction motor with short-circuited rotor winding, which motor is started on no-load at reduced tension and is switched over to full tension only after the motor has reached its full no-load speed, said clutch comprising driving and driven members, primary retarding means for controlling the movement of the driving clutch member from starting to a point short of clutching position during a time period while the motor and driving member of the clutch have been accelerating and attained no-load speed maximum, and further retarding means operating to yieldingly prevent clutch engagement of the driving member with the driven member for a time period after maximum no-load speed is attained sufficient for enabling the motor to be supplied with the full tension required for taking the load without causing undue current rushes.

9. In an automatic clutch coupling for starting the load of an asynchronous alternating electric current motor having a short circuited armature winding, a driving member, a driven member, a clutch member for coupling said driving and driven members and adapted to be moved into engagement with the driven member automatically when the motor has attained its maximum speed, and means controlling said clutch member whereby the coupling action is not initiated until the motor has ceased to accelerate and whereby time is allowed for the starting connection of the supply circuit of the motor to be cut out after the motor has attained its maximum speed but before the load is applied.

10. An automatic clutch coupling according to claim 9 wherein the means which prevents the driving engagement of the clutch member while the motor is accelerating consists of a pin and slot connection between the clutch member and the driving member of the coupling, so arranged that the reaction of the clutch member due to the centripetal acceleration of the driving member moves the clutch member out of driving engagement a gradual movement of the clutch member into driving engagement being permitted when the motor ceases to accelerate.

11. A modification of the automatic clutch coupling according to claim 9, wherein the means which prevents engagement of the clutch member while the motor is accelerating consists of a displaceable member, a body of liquid which rotates with the clutch member and produces a pressure due to centrifugal force upon said displaceable member, and a spring acting on the displaceable member, said member adapted to be moved against the action of said spring when the speed of rotation reaches a predetermined limit so as to release the liquid and allow the clutch member to move into driving engagement with the driven member, and frictional means retarding the movement of the displaceable member so as to delay the engagement of the clutch member to allow for the starting connection of the supply circuit of the motor to be cut out after the motor has attained its maximum speed but before the load is applied.

12. In an automatic clutch coupling for starting the load of an asynchronous alternating electric current motor having a short circuited armature winding, a driving member, a driven member, a clutch member carried by the driving member for coupling said driving and driven members and movable into engagement with the driven member automatically by centrifugal force, and means retarding said clutch member whereby the coupling action is delayed until the motor has reached its maximum acceleration, the said retarding means being operative to delay the maximum coupling efficiency of the parts until the motor has attained its maximum speed and thereafter for a time wherein a connection of the supply circuit of the motor is interrupted.

13. In an automatic clutch coupling for starting the load of an asynchronous alternating electric current motor having a short circuited armature winding, a driving member, a driven member, a clutch member carried by the driving member for coupling said driving and driven members and movable into engagement with the driven member automatically by centrifugal force, the relation of the elements being such that the clutch member is moved when the motor has attained substantially its maximum revolutions per minute, and means retarding said clutch member whereby the coupling action is delayed until the motor has reached its maximum acceleration, the said retarding means being operative to delay the maximum coupling efficiency of the parts between the time the motor has attained its maximum speed and the application of the load and during which time the starting connection of the supply circuit of the motor is interrupted.

In testimony whereof I affix my signature.
KARL OBERMOSER.